May 12, 1964     S. M. SELIS ETAL     3,132,971
COMPACT TYPE HIGH-POWER BATTERY
Filed Oct. 6, 1960
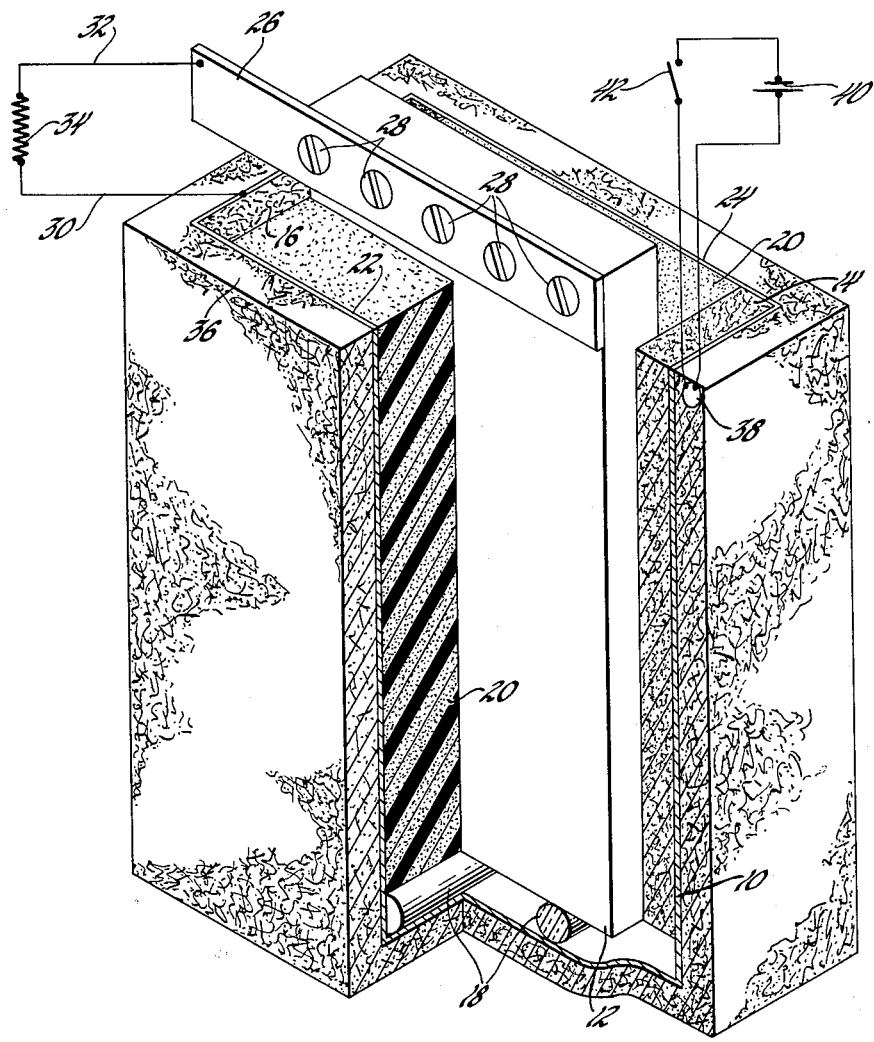
INVENTORS
Sidney M. Selis, &
BY John P. Wondowski
ATTORNEY

United States Patent Office 3,132,971
Patented May 12, 1964

3,132,971
COMPACT TYPE HIGH-POWER BATTERY
Sidney M. Selis, Royal Oak, and John P. Wondowski, Warren, Mich., assignors to General Motors Corporation, Detroit, Mich., a corporation of Delaware
Filed Oct. 6, 1960, Ser. No. 60,880
6 Claims. (Cl. 136—83)

This invention relates to a new and useful improvement in batteries and more particularly to a new electrochemical system which can be used to make a thermal battery that sustains higher current densities for longer durations than any voltaic cell heretofore known of comparable size and weight.

It is currently of great importance to obtain an extremely compact source of high electrical power which is reliable even after years of storage. Such a source is of particular importance in military guided missile applications. The silver oxide-zinc battery is a sufficiently compact source of high electrical power for many applications. However, its reliability becomes questionable after extended periods of storage especially at elevated temperatures. Thermal batteries, on the other hand, are reliable after extended storage but, heretofore, were not a compact source of high electrical power.

It is a primary object of this invention to provide a thermal battery which is not only highly reliable but is also a compact source of high electrical power. A further object is to provide a battery which will produce at least twice the power obtained per unit weight and volume from the best silver oxide-zinc battery currently commercially available.

Other objects, features and advantages of the invention will become more apparent from the following description of specific embodiments thereof and from the drawing which perspectively shows, with parts broken away, a thermal battery such as contemplated by the invention, and diagrammatically shows a system for remotely activating such a battery.

Generally, the invention comprehends an electrochemical system for producing relatively large amounts of electrical power per unit volume and weight. Encompassed is a voltaic cell formed of a calcium negative electrode and a silver positive electrode mutually in contact with a molten salt electrolyte containing lithium ions, silver ions and chromate ions. Solid calcium and silver electrodes in contact with a fused salt electrolyte formed of lithium chloride, potassium chloride, silver chloride and potassium chromate can be used to obtain the benefits of the invention.

As the basic anode reaction involves oxidation of calcium, it is generally preferred that the anode be made of a metal containing more than 90%, by weight, calcium. Best results have been obtained using an anode made of substantially pure calcium, approximately 98% to 99%, by weight, calcium. Since alloying generally makes the calcium less anodic, any non-galvanic advantage obtainable with the calcium alloy would probably be offset by an accompanying loss in galvanic activity. However, in certain instances it may be preferred to use a calcium alloy as the anode. Hence, we intend to encompass not only pure calcium but also the useful alloys thereof by the term "calcium."

During operation of the system, the surface of the calcium electrode is maintained in a fluid condition, rather than a solid condition. Accordingly, little advantage is obtained by using powdered calcium, as opposed to using ingot calcium, as an electrode metal. As the surface of the electrode is fluidized, particles of the powdered calcium coalesce, tending to yield a continuous surface, substantially negating the advantage of using powdered calcium. Moreover, extensive air oxidation and difficulties in fabrication are encountered using the powdered calcium electrode. Thus, it is preferred to employ ingot calcium, rather than calcium in the powdered state.

The power-producing cathode reaction involves a reduction of metal ions to the free state, i.e., silver ions to free silver. This and other metal-metal ion reactions are extremely fast and make possible the high-power feature of the battery. Thus, during operation of the system the cathode is coated with a layer of the free metal, e.g., silver. In operation the system produces, at least, a fairly continuous coating of the electrochemically formed metal on the cathode. Once the coating is formed, the cathode potential is essentially governed by the nature of the metal coating.

If the cathode base metal is other than the metal formed by the cathode reaction, a change in electrode potential is exhibited during operation of the system. As use of a silver base with a silver ion-containing electrolyte provides the highest feasible cathode potential available from the system, the silver base is preferred. Moreover, the use of this combination substantially immediately provides a high relatively constant potential, which consequently provides a high and constant amount of electrical power in a small amount of time. Analogously, little galvanic advantage is obtained by using an alloy of silver as an electrode metal. However, in certain instances, it may be preferred to use an alloy of silver to obtain a physical or mechanical advantage. Thus, the term "silver," as used herein, is intended to encompass both pure silver and the useful alloys thereof, unless otherwise designated.

The physical state of the cathode may be conducive to the obtaining of higher cell power. However, at present, it appears that the calcium electrode is that which limits high power in our system and, for this reason, little change is to be expected by using silver in one physical state rather than another. Thus, silver ingot can be used as efficiently as silver powder, and the continuous metal coating formed on the cathode during discharge would materially reduce the advantage gained in using a powdered metal cathode.

The electrolyte employed in our electrochemical system is essentially a molten salt, a non-aqueous liquid mixture containing lithium ions, a cathodically active metal ion such as silver ions, and chromate ions. As an identical electrolyte can be used for the anode and cathode, no porous separator is required for operability of a voltaic cell formed with the system.

However, in certain instances, it may be highly advantageous to employ a separator, especially when making an extremely compact cell. Although not a problem with a cell made with the preferred embodiment of our system, dendrites forming on the cathode may build up sufficiently to cause a short circuit between the anode and cathode. Use of a porous separator would inhibit such a short circuit.

The use of a porous material also provides certain other advantages, such as providing an increase in electrode area which is in contact with the electrolyte. Thus, a smaller amount of electrolyte can be used with porous material (a wick) to provide the same amount of electrode-electrolyte contact area. Consequently, a lesser amount of heat is necessary to fuse the electrolyte. The latter is of considerable importance when making a compact self-contained power supply.

The presence of the lithium ion in the electrolyte is apparently necessary to obtain the high rate of power output from the cell. The complete function of the lithium ion in this connection is not clearly understood. However, at the operating temperature of the system it appears that the lithium ion reacts with calcium metal as follows:

$$Ca° (s) + 2Li^+ (1) \rightleftharpoons 2Li° (1) + Ca^{++} (1)$$

As indicated in the above equation, the calcium is oxidized and lithium is reduced to the free metal. The lithium metal thus formed, then, reacts with more calcium metal to form a low melting calcium-lithium alloy on the surface of the calcium. This alloy is molten at the temperature at which the system is operated. The fluidity of the surface keeps this electrode depolarized. It is believed that without the fluid layer present on the anode a firm, solid layer of silver or oxidized calcium would be formed, causing the electrode to be less anodic in nature.

Although lithium chloride has been found to provide especially satisfactory results as a source of lithium ions for the electrolyte mixture, other lithium-containing compounds may, in certain instances, be preferred. In general, a satisfactory lithium-producing compound would be one which is not only thermally stable at the operating temperature of the system but in appropriate admixture with other electrolyte salts produces a mixture which is molten at a suitable temperature.

A sufficient amount of lithium ion should be present to maintain the surface of the calcium electrode fluid under the anode current density at which power is generated. A sufficient proportion of the lithium ion-producing salt should also be present to produce a sufficiently low melting point for the electrolyte mixture. Analogously, the melting point for the electrolyte mixture can be raised objectionably by using unduly large proportions of the lithium ion-producing salt.

Thus, a satisfactory proportion for the lithium ion-producing salt is one at which the anode surface and the electrolyte can concurrently be liquid under the selected operating conditions for the system. Generally, satisfactory results can be obtained in our preferred system using about 45 mole percent to 70 mole percent of lithium chloride.

The potassium chloride is present principally to lower the melting point temperature of the electrolyte salt mixture. It further functions as a diluent in obtaining the preferred molar proportions of the various active components in the electrolyte mixture. Under some conditions it may be preferred to employ another similarly functioning salt, such as sodium, cesium and rubidium salts, in place of part or all of the potassium chloride.

The molar proportion of potassium chloride which is preferred depends not only upon the desired melting point temperature of the electrolyte mixture but also upon the proportions of the other components one desires to establish in the mixture. A mixture containing about 40 mole percent potassium chloride has provided best results. This proportion provides the widest latitude in cell operating temperature and, for this reason, is preferred to insure satisfactory operability of batteries made under commercial production conditions.

Exceptionally satisfactory results have been obtained using silver chloride as a source of cathodically active metal ions in the electrolyte mixture. However, in some circumstances, other silver salts may be preferred as a source of silver ions. As previously indicated, any salt employed should be thermally stable and, in suitable molar proportion, permit the electrolyte mixture to be molten at the operating temperature of the system. At least 10 mole percent silver chloride is preferably used in the electrolyte mixture for highest power drains. If a lesser molar proportion is used, the silver ion may be depleted in the vicinity of the cathode faster than more silver ion can diffuse into the vicinity, causing a drop in voltage. On the other hand, when more than 20 mole percent of silver chloride is present, the calcium potential becomes unstable despite the presence of chromate ion.

It is chiefly contemplated that the cathodically active metal ion in the electrolyte be silver ion but other operable systems can be formed using other metal ions in place of the silver ions. Copper ions, nickel ions or iron ions, preferably in combination with cathodes made of the respective metals involved, can be used.

The potassium chromate obviously functions, in some manner, to stabilize the calcium potential in our electrochemical system. Without potassium chromate in the electrolyte mixture, varying potentials are obtained from the system and some metallic silver is deposited on the calcium electrode, causing internal short circuits with an attendant change in electrode potential. The addition of potassium chromate to the electrolyte apparently eliminates deposition of silver at the calcium electrode and stabilizes the calcium electrode potential. The potassium chromate is apparently not galvanically reduced during operation of the system.

Although the function of the chromate ion in the electrolyte mixture is evidenced by its effect on silver deposition and the calcium electrode potential, the mechanism by which this occurs is not clearly understood. The chromate ion appears to be the essential component of the salt and, accordingly, any suitable chromate salt can be used. Sodium, cesium or rubidium chromates can be used. Moreover, if desired, the lithium ion and silver ions can be introduced into the electrolyte mixture as chromates. It is to be understood, of course, that the gram ion relationships of about 1:7.3:1.5 for the chromate ion, lithium ion and the cathodically active metal ion, respectively, are preferably maintained in the electrolyte for best results.

Small but effective amounts up to molar proportions as high as about 7 mole percent potassium chromate can be used. However, approximately 5 mole pecent potassium chromate provides generally satisfactory results for high current density drains on the calcium electrode. Best results have been obtained using approximately 6.6 mole percent potassium chromate.

While the foregoing discussion of the various electrolyte components has disclosed use of chloride salts, the chloride salts may be replaced in part or wholly by other salts, such as bromides and, in some cases, nitrates. Bromide salts generally provide an electrolyte of higher viscosity and, since higher viscosities generally mean lower conductivity, bromide salts would not be preferred for most applications of our electrochemical system. As previously pointed out, the salts should be chemically stable and, in appropriate admixture, provide an electrolyte mixture which is liquid at the system operating temperature.

Although the absolute minimum high current density operating temperature of our electrochemical system is believed to be the melting point temperature of the calcium-lithium alloy, in practice it is the electrolyte which probably will actually determine the minimum operating temperature. In order to become sufficiently conductive for high current density operations the preferred electrolyte combinations must be heated to a temperature substantially higher than the melting point temperature of the calcium-lithium alloy. Thus, in effect, the electrolyte would determine the minimum operating temperature of the system.

The maximum temperature at which satisfactory results can be attained with our electrochemical system is limited by a competing chemical reaction at the calcium electrode. At temperatures above about 550° C. calcium becomes excessively chemically reactive with our preferred electrolyte mixture. Above about 550° C. this competing chemical reaction drastically reduces the efficiency of the preferred system to such an extent as to make use of such temperatures undesirable.

A description of a specific example of the invention is facilitated by reference to the drawing. There is shown in the drawing a remote activated battery employing our electrochemical system. The battery construction shown includes a silver electro-formed container 10 which also functions as a positive electrode, cathode, of the battery. A calcium negative electrode 12 is disposed within the container and spaced therefrom throughout its periphery. Cyclized polyacrylonitrile non-woven insulating spacers 14 and 16 are used, respectively, to maintain the lateral surfaces of the calcium electrode spaced from the silver container. Glass rods 18 space the lower end of the calcium electrode from the bottom of the silver container.

A non-aqueous liquid electrolyte mixture 20 of the following composition is disposed interjacent the main lateral surfaces of the calcium electrode and the side walls 22 and 24 of the container:

|  | Mole percent |
|---|---|
| Potassium chloride | 34.9 |
| Lithium chloride | 48.5 |
| Silver chloride | 10.0 |
| Potassium chromate | 6.6 |

The manner in which the terminal connection is made to the calcium electrode can affect the amount of power obtained from the cell. For optimum cell power, resistance at the terminal connections should be minimized. As shown in the drawing, a silver bar 26 is bolted to the calcium electrode using nickel or silver plated bolts 28. Heating the connection in an inert atmosphere promotes interdiffusion of the calcium and nickel or silver to form an intimate electronic connection therebetween.

Electrical leads 30 and 32 are secured, respectively, to the silver terminal bar and the container. The leads, in turn, are suitably connected to an external load 34 which consumes the electrical power generated by the battery. The connection for the leads 30 and 32 to silver can be accomplished in the normal and accepted manner for making electrical connections to silver, for example, by bolting, silver soldering or the like.

The exterior of the container is coated with a paste made of a filler material, such as glass fibers, a pyrotechnic material and water. A pyrotechnic material formed of about 26%, by weight, zirconium and the balance barium chromate can be used. A paste is applied as a wet surface coating 36 and dried. An electric match 38 is embedded in the coating to provide a means for igniting the pyrotechnic material. A percussion primer or acceleration force can also be used for this purpose.

The electric match is connected to an electrical power source 40 in series with a switch 42. Closing of the switch permits a flow of current through the electric match, igniting the match composition which, in turn, ignites the pyrotechnic material. The ignition of the pyrotechnic material generates heat which fuses the electrolyte salts, thereby activating the battery.

It is to be understood that although the invention has been described in connection with certain specific examples thereof, no limitation is intended thereby except as defined in the appended claims.

We claim:
1. A voltaic cell comprising a calcium negative electrode, a positive electrode and, in contact therewith, a molten salt electrolyte mixture containing a lithium ion-producing salt, a silver ion-producing salt and a chromate ion-producing salt, said ions being present in a gram ion relationship of about 7.3:1.5:1, respectively.

2. A voltaic cell comprising a calcium negative electrode, a silver positive electrode and, in contact with said electrodes, a molten salt electrolyte mixture containing from small but effective amounts to approximately 70 mole percent of a lithium ion-producing salt, from about 10 mole percent to 20 mole percent of a silver ion-producing salt and about 5 mole percent to 7 mole percent of a chromate-producing salt.

3. A voltaic cell comprising a calcium negative electrode, a positive electrode formed of a metal from the group consisting of silver, nickel, copper and iron and, in contact with said electrodes, a molten salt electrolyte mixture containing from small but effective amounts to approximately 70 mole percent of a lithium ion-producing salt, up to about 7 mole percent of a chromate ion-producing salt, and a salt for producing a cathodically active metal ion from the group consisting of silver ion, nickel ion, copper ion and iron ion.

4. A voltaic cell such as defined in claim 3 in which the cathodically active metal ion in said electrolyte mixture is of the same metal of which the positive electrode is formed.

5. A voltaic cell comprising a calcium negative electrode, a silver positive electrode and, in contact with said electrodes, a molten salt electrolyte mixture containing approximately 45 mole percent to 70 mole percent lithium chloride, about 15 mole percent to 40 mole percent potassium chloride, about 5 mole percent to 7 mole percent potassium chromate and about 10 mole percent to 20 mole percent silver chloride.

6. In a method of generating electrical power, the steps of forming an electrolyte mixture containing approximately 45 mole percent to 70 mole percent of a lithium chloride, approximately 15 mole percent to 40 mole percent potassium chloride, approximately 10 mole percent to 20 mole percent silver chloride and approximately 5 mole percent to 7 mole percent potassium chromate, heating said mixture to a temperature at which said mixture is liquid but below approximately 550° C., immersing a calcium electrode in said heated mixture, immersing a silver electrode in said heated mixture non-contiguous said calcium electrode, and making an electron connection between said electrodes.

References Cited in the file of this patent

UNITED STATES PATENTS

| 2,102,701 | Gyuris | Dec. 21, 1937 |
| 2,696,513 | Lehovac | Dec. 7, 1954 |
| 2,937,220 | Bauman | May 17, 1960 |
| 2,953,620 | Smyth et al. | Sept. 20, 1960 |

FOREIGN PATENTS

| 152,364 | Great Britain | Feb. 14, 1922 |

OTHER REFERENCES

Journal of the Electrochemical Society, volume 99 (1952), pages 207C–208C.